United States Patent [19]

Morris et al.

[11] Patent Number: 5,101,619
[45] Date of Patent: Apr. 7, 1992

[54] METHOD FOR CORRECTING A HOT START CONDITION

[75] Inventors: Laurie J. Morris, South Windsor; Brigitte B. Falke, Union, both of Conn.

[73] Assignee: United Technologies Corporation, Hartford, Conn.

[21] Appl. No.: 481,837

[22] Filed: Feb. 20, 1990

[51] Int. Cl.⁵ .............................................. F02C 7/26
[52] U.S. Cl. ................................ 60/39.06; 60/39.141
[58] Field of Search ............. 60/39.06, 39.091, 39.094, 60/39.141, 39.281

[56] References Cited

U.S. PATENT DOCUMENTS

| | | |
|---|---|---|
| 2,637,165 | 5/1953 | Stockingen ........................ 60/39.091 |
| 3,964,253 | 6/1976 | Paduch et al. .................... 60/39.281 |
| 4,010,606 | 3/1977 | Hansen ............................. 60/39.281 |
| 4,350,008 | 9/1982 | Zickwolf ........................... 60/39.141 |

Primary Examiner—Louis J. Casaregola
Attorney, Agent, or Firm—Troxell K. Snyder

[57] ABSTRACT

A method for correcting a hot start condition in a gas turbine without requiring a complete shutdown and reinitiation of the startup sequence includes temporarily interrupting the flow of fuel to the engine for a brief period of time following detection of an impending hot start condition.

4 Claims, 1 Drawing Sheet

METHOD FOR CORRECTING A HOT START CONDITION

FIELD OF THE INVENTION

The present invention relates to a method for correcting a hot start condition in a gas turbine engine.

BACKGROUND

The process for starting a gas turbine engine is a complicated procedure which requires continual monitoring of various engine parameters to avoid damaging engine components. One potentially damaging condition which may arise during engine startup is a hot start. The exact cause of a hot start condition in a gas turbine engine has been the subject of much speculation and theory, however, the detection of the occurrence of a hot start condition is well known.

A hot start condition occurs when the temperature of the working fluid exiting the turbine section of the gas turbine engine exceeds, by a certain amount, the expected exhaust gas temperature schedule for the engine during a normal startup. As will be appreciated by those skilled in the art, an unaddressed hot start condition can cause the gas temperature in the turbine section to exceed allowable material temperature limits, thereby shortening or ending the life of internal engine components such as blades, disks, seals, etc. Typical engine starting procedures therefore call for careful monitoring of the exhaust gas temperature, and immediate shutdown of the startup sequence should exhaust gas temperature exceed the appropriate limit.

As will further be appreciated, the shutdown of a startup sequence is particularly inconvenient as it requires the engine rotor to remain turning under the influence of the engine starter motor for a sufficient period of time to clear all fuel and combustion products from the engine. The entire startup sequence is then reinitiated. The resulting delay can become particularly costly, particularly in today's congested air traffic environment when a few minutes' departure delay can disrupt busy airport scheduling.

DISCLOSURE OF THE INVENTION

The present invention provides a method for quickly correcting a hot start condition in a gas turbine engine which does not abort and reinitiate the entire startup process. The method of the present invention briefly interrupts the starting sequence to clear the hot start condition, resuming the starting procedure at the point of detection of the hot start, and without going through the entire "purge and reinitiate" process of the prior art.

According to the present invention, detection of an impending hot start causes the engine fuel control to briefly and instantly shut off the flow of fuel to the engine combustor. Fuel flow is resumed at approximately the former rate of flow at the end of the brief period, allowing the engine to continue the startup sequence from the point of detection of hot start.

In a further refinement of the method of the present invention, fuel flow is maintained for a predetermined period of time following resumption, regardless of engine parameters that may tend to show a continuing hot start condition. If the indication of a hot start has not cleared at the expiration of the predetermined period, according to the method of the present invention fuel flow is shutdown again for a brief and the above steps are repeated.

DETAILED DESCRIPTION

Figure 3:
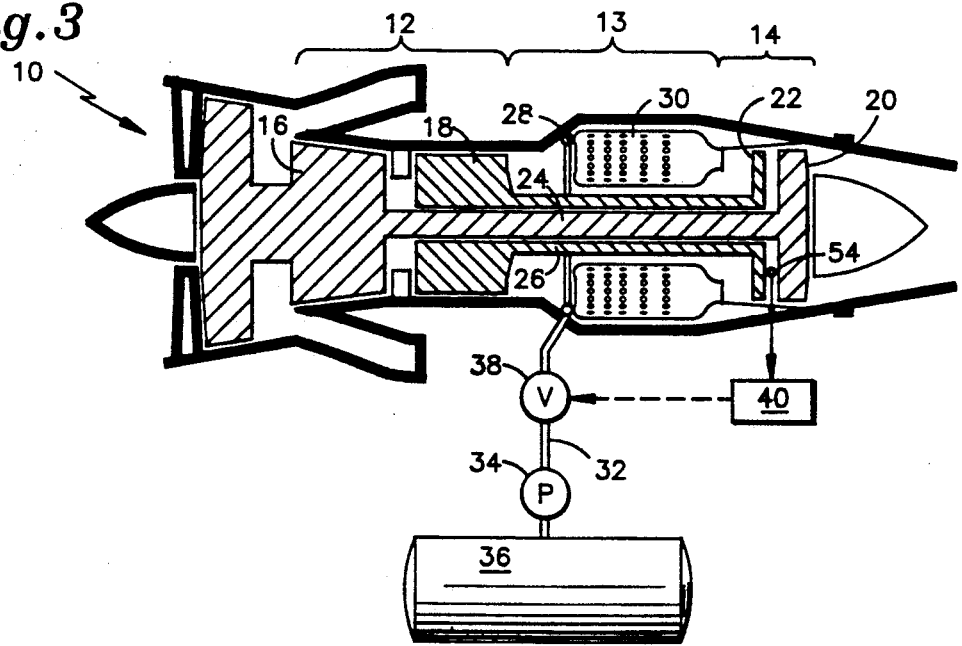
FIG. 3 shows a schematic representation of a gas turbine engine and fuel control for effecting the method of the present invention.

Referring to the drawing figures, FIG. 3 shows a schematic cross section of a gas turbine engine 10 having a compressor section 12, a combustor section 13, and a turbine section 14. The particular engine 10 shown in FIG. 3 is of the two rotor variety, having a low pressure compressor 16 driven by a low pressure turbine 20 and a high pressure compressor 18 driven by a high pressure turbine 22. The high and low rotors turn on separate, concentric shafts, 24, 26 as shown. The combustor section 13 includes a fuel distribution manifold 28 for supplying fuel to the combustion chamber 30. Fuel is delivered through a fuel supply line 32 fed by a pump 34 and fuel tank 36 shown schematically in FIG. 3. Fuel flow is regulated by a valve 38 which is in turn controlled by a controller 40 as is well known in the art.

During startup of the engine 10, a starter motor (not shown) drives the high pressure compressor 18 and turbine 22 to establish air flow through the engine 10. Fuel is introduced to the combustion chamber 30 from the manifold 28, and ignited by one or more high energy spark ignitors (also not shown). Typical startup sequencing slowly ramps up fuel flow with increasing high rotor speed, the rate of increase of fuel flow being selected so as to allow the engine components to increase in speed and temperature at a rate which does not cause damage or overheating of the engine components.

Figure 1:
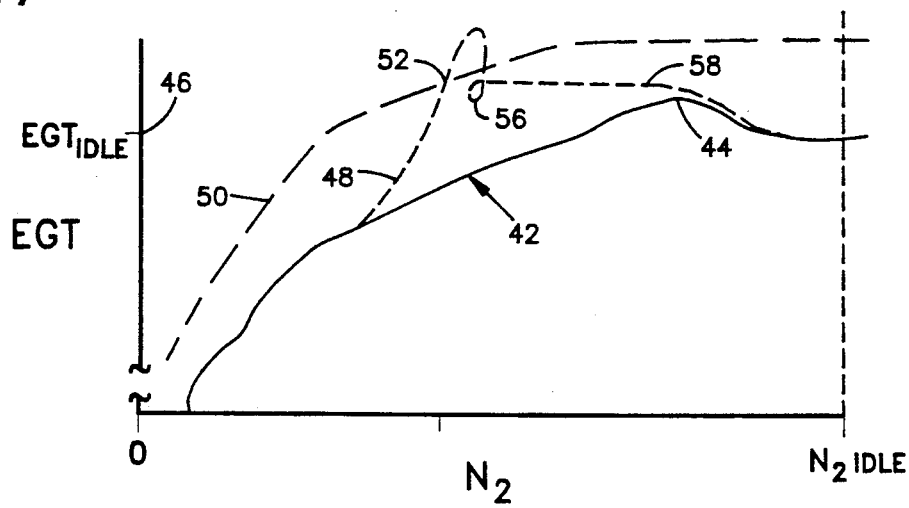
FIG. 1 is a graphic representation of engine exhaust gas temperature versus rotor speed during a typical startup and a hot start condition.

Referring to FIG. 1, exhaust gas temperature measured at the outlet of the high pressure turbine 22 is shown as compared to high rotor speed for a typical startup sequence. High pressure rotor speed, $N_2$, is raised to a threshold value by the engine starter motor, at which point fuel is introduced, combustor light-off occurs and exhaust gas temperature begins to rise as shown by the solid curve 42 which represents a normal engine start up. As rotor speed reaches $N_{2IDLE}$, exhaust gas temperature reaches a peak 44 and drops back to idle temperature, $EGT_{IDLE}$ 46.

A hot start is represented by the broken curve 48 which departs from the normal curve 42 rising rapidly with a minimal increase in rotor speed $N_2$. Prior art methods and systems for detecting an impending hot start condition rely on a maximum startup temperature schedule, shown in FIG. 1 as the broken line 50 for comparing with measured exhaust gas temperature. At any time during the startup sequence, should exhaust gas temperature exceed the maximum temperature schedule 50, the controller will identify an impending hot start condition and initiate corrective action.

In the prior art systems described hereinabove, such corrective action is limited to a complete shutdown of the fuel flow to the engine and blocking of any further attempts on the part of the engine operator to reinitiate the start sequence until a set period, typically 30 seconds, has elapsed. At that point, the prior art requires initiation of the entire startup sequence from time equals zero, essentially a complete new attempt to start the engine.

The method according to the present invention, rather than completely ending the startup sequence and requiring the operator to reinitiate, provides a brief period of interrupted fuel flow, preferably on the order of about two seconds during which time any flow instabilities which may have caused the occurrence of the hot start condition are cleared from the engine. At the expiration of the brief fuel interrupt period, the method according to the present invention reestablishes fuel flow at the rate appropriate for current engine conditions, thus continuing the start sequence from essentially the point of detection of the impending hot start condition.

Referring again to FIG. 1, curve 48, representing an impending hot start, departs the normal startup temperature curve 42 and rises rapidly, passing the maximum temperature schedule 50 at point 52. As point 52 is reached, the engine controller 40, monitoring temperature by a temperature measuring means 54 disposed at the outlet of the high pressure turbine 22, commands an immediate shutdown of the fuel control valve 38, thereby temporarily ceasing all fuel flow to the combustion chamber 30. This fuel interrupt, or depulse, continues for a brief period of time, preferably about two seconds, after which fuel flow is resumed at approximately the same rate of flow as immediately before the detection of the hot start condition.

As can be seen in FIG. 1, interruption of the fuel flow quickly results in a drop 56 of exhaust gas temperature. The brief interrupt further allows airflow through the compressor and combustor sections 12, 13 to stabilize and, based on test results, usually avoids a recurrence of the hot start condition following resumption of fuel flow as noted above. This is represented in FIG. 1 by the latter portion 58 of the curve 48 which shows exhaust gas temperature remaining below the maximum temperature schedule 50 and eventually returning to the idle temperature 46.

Figure 2:
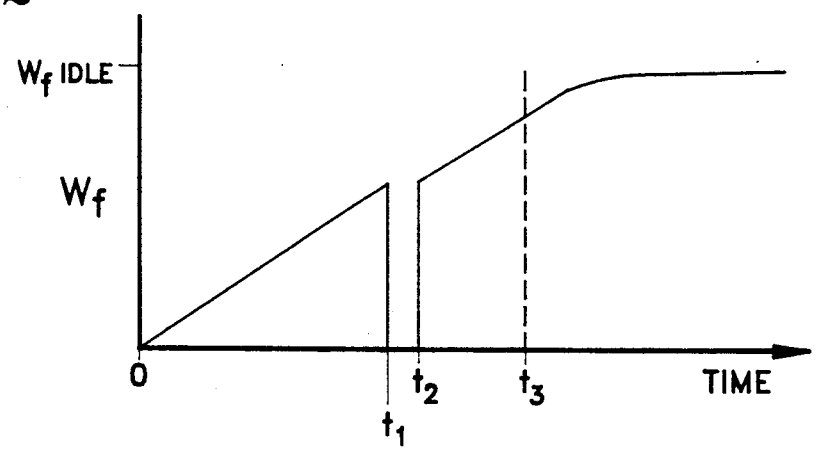
FIG. 2 shows the variation of engine fuel flow with time during an engine start using the correction method according to the present invention.

FIG. 2 shows the variation of fuel flow $W_f$ with time for an engine startup sequence including a fuel depulse in response to a detected impending hot start condition. At time $t_1$, which coincides with the detection of exhaust gas temperature exceeding the maximum startup temperature schedule, fuel flow is reduced immediately to zero and held there for a brief period of time represented by the interval $t_1-t_2$. At the end of the brief period, $t_1-t_2$, fuel flow is resumed and the startup sequence continued.

A further feature of the method according to the present invention recognizes the transient nature of the hot start condition and further adds the requirement that the fuel controller 40 maintain fuel flow to the engine for a preselected period of time after a fuel depulse has occurred. This preselected period, represented in FIG. 2 by the interval between $t_2$ and $t_3$, allows any transient effects resulting from the hot start condition and/or fuel depulse to clear the engine, thereby giving the controller a better indication of current engine condition. In particular, the controller, according to the further embodiment of the present invention, is instructed to ignore an indication of exhaust gas temperature exceeding the maximum temperature curve 50 during the preselected time period following the fuel depulse. This preselected period of time is preferably on the order of 10 seconds and is selected based on the transient response of the particular engine model or size.

Should exhaust gas temperature at the end of the preselected period still exceed the allowable temperature limit 50, the method according to the present invention, will again initiate a fuel depulse for the brief period of time, again giving the engine to clear the stall condition and continue with the startup condition.

As will be apparent in those skilled in the art, the occurrence of a fuel depulse in response to a detected impending hot start condition delays achievement of engine idle operation by only a few seconds, rather than the prior art method for accommodating a detected hot start condition which requires the engine operator to shutdown the startup sequence, purge the engine of all fuel and combustion products, and to reinitiate the entire sequence from the beginning.

We claim:

1. A method for correcting a hot start condition in a gas turbine engine having a fuel control including a means for measuring the temperature of the exhaust gas exiting the engine turbine section and means for controlling a flow of fuel to the engine combustion section, comprising the steps of:

a. determining, responsive to the measured exhaust gas exit temperature, the occurrence of an impending hot start condition in the engine;

b. shutting off the flow of fuel to the engine by the controlling means for a brief period of time responsive to the determined impending hot start condition, the brief period of time being approximately two seconds; and c. resuming the fuel flow to the engine for a preselected period of time immediately following the brief period of time.

2. The method as recited in claim 1, wherein the step of determining the occurrence of a hot start condition includes the step of comparing the measured exhaust gas temperature with an allowable temperature, wherein the impending occurrence of a hot start condition is determined responsive to a measured exhaust gas temperature exceeding the allowable temperature.

3. The method as recited in claim 1, further comprising the step of maintaining fuel flow following the resuming step for a preselected period of time.

4. The method as recited in claim 3, wherein the preselected period of time is 10 seconds.

* * * * *